United States Patent [19]

Stevenson et al.

[11] Patent Number: 4,489,914

[45] Date of Patent: Dec. 25, 1984

[54] VALVE ASSEMBLY

[76] Inventors: Robert C. Stevenson, 31 Selwyn Rd.; Michael G. Enright, 23 Copperfield Ter., both of Howick, Auckland; Bruce Nodwell, 15 Bluegum Rise, Pakuranga, Auckland, all of New Zealand

[21] Appl. No.: 269,728

[22] Filed: Jun. 2, 1981

[51] Int. Cl.³ .................... F16K 51/00; B05B 15/08
[52] U.S. Cl. .................................. 251/147; 251/353; 239/579; 239/587
[58] Field of Search ............... 239/579, 583, 587; 251/147, 347, 353

[56] References Cited

U.S. PATENT DOCUMENTS

| | | | |
|---|---|---|---|
| 428,199 | 5/1890 | Birkery | 251/353 |
| 1,295,250 | 2/1919 | Yeiser | 239/583 |
| 2,697,638 | 12/1954 | Anger | 239/579 |
| 2,988,289 | 6/1961 | Thompson | 239/579 |
| 3,017,124 | 1/1962 | Knight | 239/583 |
| 3,030,033 | 4/1962 | Rosenkranz | 239/583 |
| 3,219,278 | 11/1965 | Santarelli | 239/579 |

Primary Examiner—A. Michael Chambers
Attorney, Agent, or Firm—Murray Schaffer

[57] ABSTRACT

The valve assembly of the present invention is intended for use, within a section of pipe, to control the flow of a fluid within the pipe. The invention discloses an arrangement in which two sections of concentric pipe are slidable with respect to each other between a first position which allows fluid to flow along the pipe and a second position in which fluid flow is stopped. The outer section of pipe has a sealing plug supported in an annular position within its bore which either abuts the end of the inner section of pipe to close the valve or is separated from it to open the valve.

15 Claims, 4 Drawing Figures

VALVE ASSEMBLY

BACKGROUND OF THE INVENTION

It is intended that the valve assembly of the present invention be used to control fluid flow along a pipe in those situations where the fluid pressure within the pipe is fairly low and preferably less than the typical fluid pressures encountered in a domestic mains water supply. The invention is a useful adjunct for a shower to be used when camping or caravaning. For example the valve assembly may be incorporated into a fluid outlet from a container such as a bag which is adapted to hold fluid volumes in the order of up to about 20 liters and which is suspended above head height from a support. Water outflow from such a container can then be controlled by manually operating the valve assembly of the invention. The invention however is not limited to such applications.

BRIEF SUMMARY OF THE INVENTION

The valve assembly of the present invention comprises two portions of close fitting and concentric pipe which are slidable with respect to each other. Within the outer such section of pipe there is a sealing means in the form of a plug of circular cross section which is concentric with the outer section of pipe. Thus when the two sections of pipe are slid, along the direction of their axes, relative to one another the plug is moved between a first position wherein it is separated from the other section of pipe to allow fluid to flow along the pipe sections and a second position wherein the plug is pushed against the inner section of pipe to thereby block the internal passage of the pipe and prevent fluid from flowing along it. In the preferred form of the invention the outlet end of the outer section of pipe is flared and has a perforated disc over its end so that it takes the form of a shower rose. A preferred embodiment of the invention will now be described by way of example only.

DETAILED DESCRIPTION OF THE PREFERRED EMBODIMENT

Figure 1:
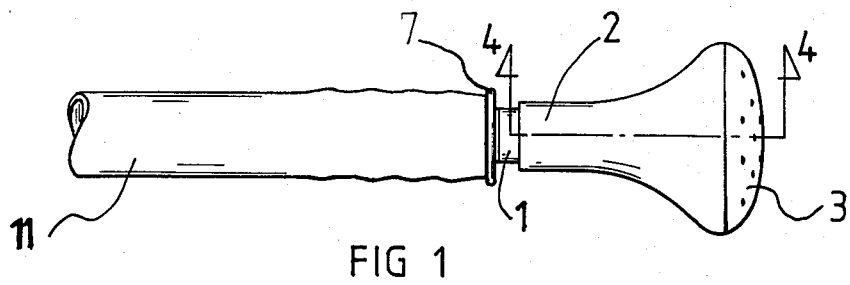
FIG. 1 is a side elevation of the valve assembly showing the valve in an open position and with a length of fluid conduit attached to the valve assembly.
Figure 2:
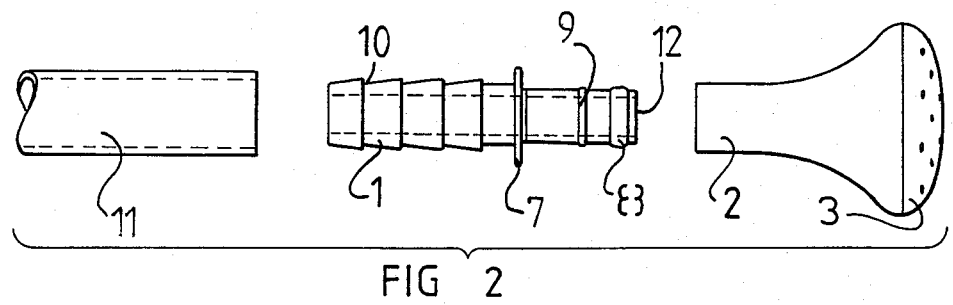
FIG. 2 is a side elevational view of the disassembled portions of the fluid conduit and valve assembly shown in FIG. 1.
Figure 3:
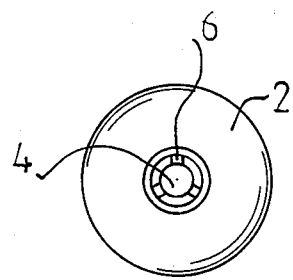
FIG. 3 is a view looking along the axis of the valve assembly from the flared end and with the perforated disc removed.
Figure 4:
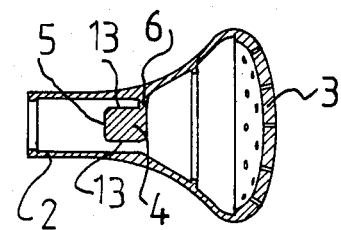
FIG. 4 is a cut away view along 4—4 of FIG. 1.

In the preferred embodiment of the present invention the valve assembly consists of two sections of concentric pipe. The inner section 1 is a close fit within the outer section 2 so that when the two sections are slid relative to each other there is frictional contact between the outer wall of the inner pipe and the inner wall of the outer pipe. Preferably the outlet end of the outer section of pipe is flared outwardly and the end is closed by a perforated disc 3.

Within the internal bore of the outer section of pipe there is a sealing means 4. The sealing means is a plug of circular cross section and is conveniently shaped in the form of a hollow cylindrical tube having a closed end 5 at the inlet end of the plug. The plug is concentric with the outer section of pipe and is supported away from the internal walls of the outer section of pipe by a number of radial fingers 6 about its periphery. It is convenient for there to be three radial fingers about the periphery of the plug.

The inner section 1 of the pipe has, towards its outlet end, a collar 7 which encircles its outside wall. The collar functions as a stop to prevent the outer section 2 of pipe from being pushed too far along the inside section of pipe. An additional stop 8 in the form of a circumferential rib is located adjacent the outlet end of pipe 1 and its function is to prevent the outer section of pipe from being pulled completely off the inner section of pipe. Additionally it prevents leakage of fluid at the join between the pipe sections. To improve the frictional contact between the inner and outer sections of pipe a number of gripping means are located about the outside wall of pipe 1. These gripping means conveniently take the form of circumferential rib like members 9 although other gripping means such as raised cones or other textured effects on the outside surface of the inner tube may be employed. At the inlet end of the inner pipe there are a series of ridges 10 which also act as gripping means to assist in securing a length of fluid conduit such as 11 about the outside surface of pipe 1 between the inlet end of the pipe and collar 7. The fluid conduit 11 is a push fit onto pipe 1.

Pipe sections 1 and 2 of the valve assembly are preferably made from a relatively rigid plastics material although other materials such as metals may be used. The fluid conduit 11 is preferably formed from a relatively flexible plastics material for ease of handling and fitting onto the valve assembly.

To operate the valve, the flared section of pipe 2 is grasped in the hand, and pipe section 2 is pulled away from collar 7 on pipe section 1 to open the valve, and pushed towards collar 7 to close the valve. When the valve is closed the plug 4 is pushed against and into the end 12 of pipe 1. By this means a seal is thereby effected between the outer walls 13 of the sealing plug and the internal walls of the end 12 of the inner section of pipe.

The valve assembly is not able to withstand water pressures such as may be experienced in a domestic mains water supply system. However the valve assembly will adequately cope with the sort of pressures encountered when water flows from a container holding a volume of several liters.

It is not necessary that the sealing plug within the outer tube be of the shape described and illustrated. For example the sealing means could be in the form of a ball which may slide within the confines of the bore of pipe 2.

What we claim is:

1. A valve comprising a first inlet pipe with unobstucted bore and open at one fluid outlet end and a second outlet pipe concentrically fitted in removable sliding contact over the open fluid outlet end of said first pipe, said second pipe having a plug mounted along the central axis thereof and at least one axial passage between said plug and the inner wall of said second pipe, said plug having a shape adapted to enter into the open outlet end of said first pipe and occlude the same, said first and second pipes being axially movable relative to each other between a first position wherein said plug enters into and occludes the open outlet end of said first pipe and a second position wherein said plug is free of said open outlet end.

2. The valve as claimed in claim 1, wherein at least a portion of said plug by which said first pipe is occluded is of circular cross-section and is sealingly receivable in the open end of said first pipe.

3. The valve as claimed in claim 2, wherein said plug is supported centrally within said second pipe means by radial fingers.

4. The valve as claimed in claim 1, including a sealing collar mounted on said first pipe about its external circumference in abutment against the inner wall of said second pipe.

5. The valve as claimed in claim 4, wherein said sealing collar is a resilient sealing ring.

6. The valve as claimed in claim 1, wherein the exterior wall of said first pipe means is shaped to provide manual gripping means.

7. The valve as claimed in claim 6, wherein said manual gripping means comprise circumferential ridges about said first pipe means.

8. The valve as claimed in claim 1, wherein said open outlet end of said first pipe has a shape adapted to enter into said at least one axial passage and occlude the same when said first and second pipes are in said first position.

9. A valve incorporated in a fluid spray head, said valve and spray head comprising:
 (a) a chamber having a perforated wall for the egress of spray,
 (b) a first pipe communicating with said chamber,
 (c) an open-ended second pipe which is slidably receivable in a close fit in said first pipe through an end of said first pipe which is remote from the chamber, and
 (d) a plug which is mounted inside said first pipe between said end of said first pipe and the opening of said chamber with at least one space around said plug for the passage of fluid along said first pipe, said plug having a shape adapted to enter into the open end of said second pipe and occlude passage therethrough, said second pipe being slidable inside said first pipe to a closed-valve posiiton in which the open end of said second pipe extends over said plug and is closed by said plug, and is slidingly withdrawable from said plug to an open-valve position in which the passage of fluid from said second pipe is not blocked by said plug.

10. A valve comprising:
 a first cylindrical pipe having an open first fluid inlet end and an opposite open first fluid outlet end;
 a second cylindrical pipe having an open second fluid inlet end and an opposite second fluid outlet end, said second inlet end concentrically fitted in sliding contact over said first outlet end;
 a chamber communicating with said second outlet end, said chamber having a perforated wall for the egress of fluid spray;
 a resilient sealing rib mounted on the external circumference of said first outlet end in abuttment with the inner wall of said second pipe; and
 a cylindrical closed plug having a diameter substantially equal to the opening of said first outlet end and mounted inside said second pipe with the axis of said plug coincident with said axis of said second pipe and mounted with at least one space between said plug and the inner wall of said second pipe for the passage of fluid along said second pipe, said at least one space having a size and shape substantially identical to the size and shape of said first outlet end,
 said first pipe being slidable inside said second pipe to a closed-valve position in which said first oulet end extends over said plug and the opening thereof is sealed against fluid passage by contact of said plug with the entire circumference of the inner wall of said first outlet end and in which said first outlet end closes said at least one space, wherein the fluid barrier is further maintained by compressive pressure between the inner wall of said first outlet end and said plug and between the inner wall of said second pipe and said sealing rib, and
 said first pipe being slidably withdrawable from said closed-valve position to an open-valve position in which fluid may pass from said first inlet end, through said at least one space and out the perforated wall of said second outlet end.

11. The valve as claimed in claim 10, wherein the external circumference of said first inlet end has a plurality of conically shaped ribs with the narrower portions thereof tapering toward the opening of said first inlet end.

12. The valve as claimed in claim 11, wherein said plug is mounted inside said second pipe by a plurality of radial fingers.

13. The valve as claimed in claim 12, wherein said first pipe, said second pipe and said plug are made of semi-rigid plastic.

14. The valve as claimed in claim 13, wherein the opening of said second inlet end has an interior circumferential collar which abuts and restrains said resilient rib when said first pipe is withdrawn past said open-valve position thereby preventing accidental separation of said first and said second pipe.

15. In a portable camping shower of the type having a container adapted to hold up to about twenty liters of fluid and having a flexible fluid conduit, the improvement comprising the valve as claimed in claim 11, wherein said valve is secured to said conduit by said plurality of conically shaped ribs of said first inlet end.

* * * * *